United States Patent
Luo et al.

(10) Patent No.: US 7,720,288 B2
(45) Date of Patent: May 18, 2010

(54) DETECTING COMPOSITING IN A PREVIOUSLY COMPRESSED IMAGE

(75) Inventors: Jiebo Luo, Pittsford, NY (US); Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 1063 days.

(21) Appl. No.: 11/385,071

(22) Filed: Mar. 21, 2006

(65) Prior Publication Data

US 2007/0223838 A1 Sep. 27, 2007

(51) Int. Cl.
*G06K 9/00* (2006.01)
*G06K 9/46* (2006.01)
*G06K 9/66* (2006.01)
*G06K 9/36* (2006.01)

(52) U.S. Cl. .................. 382/191; 382/100; 382/232; 382/280

(58) Field of Classification Search .................. 382/100, 382/115, 118, 153, 173, 181, 190, 191, 232, 382/280, 293, 298–300
See application file for complete search history.

(56) References Cited

U.S. PATENT DOCUMENTS

| 6,427,031 B1 | 7/2002 | Price |
| 6,643,410 B1 | 11/2003 | Yu et al. |
| 6,904,180 B1 | 6/2005 | Gallagher |
| 7,439,989 B2 * | 10/2008 | Lin et al. ................... 345/629 |
| 2005/0069208 A1 * | 3/2005 | Morisada .................... 382/190 |
| 2007/0165261 A1 * | 7/2007 | Someya .................... 358/1.14 |

OTHER PUBLICATIONS

Gallagher, "Detection of Linear and Cubic Interpolation in JPEG Compressed Images", IEEE Proceedings of the Second Canadian Conference on Computer and Robot Vision, May 2005.*
Popescu, "Statistical Tools For Digital Image Forensics", Ph.D. Dissertation, Department of Computer Science, Dartmouth College, Hanover, NH, 2005. Available from: http://www.cs.dartmouth.edu/farid/publications/apthesis05.html.*
Popescu and Farid, "Exposing Digital Forgeries in Color Filter Array Interpolated Images", IEEE Transactions on Signal Processing, vol. 53, No. 10, pp. 3948-3959, 2005.*
Popescu and Farid, "Exposing digital forgeries by detecting traces of re-sampling," IEEE Trans. Signal Process., vol. 53, No. 2, pp. 758-767, Feb. 2005.*

(Continued)

*Primary Examiner*—John B Strege
*Assistant Examiner*—Nathan Bloom
(74) *Attorney, Agent, or Firm*—Robert L. Walker

(57) ABSTRACT

In a method and system for detecting digital image compositing, a first artifact is detected in an uncompressed digital image. The first artifact is characteristic of an earlier compression of the digital image with a predetermined compression algorithm. An interpolation marker in the image is evaluated to provide interpolation results. During the evaluating, a second artifact of the compression algorithm is counteracted. The image is classified responsive to the interpolation results. The first artifact can be a blocking artifact and the second artifact and interpolation marker can be different periodicities in the image.

22 Claims, 9 Drawing Sheets

OTHER PUBLICATIONS

Battiato and Messina, "Digital Forgery Estimation into DCT Domain—A Critical Analysis", MiFor'09, Oct. 23, 2009, Beijing, China. Copyright 2009 ACM 978-1-60558-755-4/09/10.*

Ting and Rangding, "Doctored JPEG Image Detection Based On Double Compression Feature Analysis", 2009 ISECS International Colloquim on Computing, Communication, Control, and Management, 2009 IEEE.*

Dirik and Memon, "Image Tamper Detection Based On Demosaicing Artifacts", 2009 IEEE International Conference on Image Processing, Egypt, Cairo, Nov. 2009.*

Ye et al., "Detecting Digital Image Forgeries By Measuring Inconsistencies of Blocking Artifact", 2007 IEEE International Conference on Multimedia, Jul. 2007.*

"Exposing Digital Forgeries By Detecting Traces of Re-sampling", Alin C. Popescu and Hany Farid, IEEE Transactions on Signal Processing, vol. 53, No. 2, pp. 1-11, 2005.

"Vector Quantization", Robert M. Gray, IEEE ASSP Magazine, pp. 4-29, (Apr. 1984).

"Detecting Faces In Images: A Survey", Ming-Hsuan Yang, David J. Kriegman and Narendra Ahuja, IEEE Transactions On Pattern Analysis and Machine Intelligence, vol. 24, No. 1, Jan. 2002, pp. 34-58.

* cited by examiner

DETECTING COMPOSITING IN A PREVIOUSLY COMPRESSED IMAGE

CROSS REFERENCE TO RELATED APPLICATIONS

Reference is made to commonly assigned U.S. patent application Ser. No. 10/961,892 filed Oct. 8, 2004 entitled "A METHOD FOR DETECTING IMAGE INTERPOLATION" by Andrew Gallagher, the disclosure of which is incorporated herein by reference.

FIELD OF THE INVENTION

The invention relates generally to the field of digital image processing and, more particularly, to a method and system for detecting compositing in a previously compressed image.

BACKGROUND OF THE INVENTION

In the field of image processing, it is often the case that an image must be resized for a desired application. For example, a particular printer may have a fixed resolution of 250 dpi (dots per inch). In order to print an image consisting of 500 by 750 pixels to a 4 by 6 inch print on such a printer, the image must be resized by a factor of 2. Likewise, many display devices have a fixed resolution in pixels per inch. In other words, the values of the image at locations between the original samples must be determined. This process of determining the value of an image signal at locations which are not coincident with the original samples of the image is called interpolation or resampling. The factor of interpolation, N, refers to the ratio of the sampling rate of the output image to the sampling rate of the input image. In the previous example, the interpolation factor N=2.

The process of interpolation produces an image of a desired number of rows and columns of pixels. However, the interpolation process involves "guessing" the signal value at many locations. As a result the interpolated image is generally not as high quality as an image originally captured at the desired resolution. For example, an image captured at 500× 750 pixels and then interpolated to 1000×1500 pixels will generally appear softer and of lower quality than an image resulting from capturing that same scene at 1000×1500 pixels originally.

Because of the generally lower quality of interpolated images, it can be desirable to have knowledge of whether an image had been interpolated in order to better handle the image in later digital processing and other procedures. U.S. Pat. No. 6,904,180, to Gallagher, which is hereby incorporated herein by reference, discloses a method for determining whether a digital imaging channel is interpolated or non-interpolated using a signal related to values of neighboring pixels of an image. The method looks for peak in a Fourier Transform signal computed from an extracted signal having a periodicity indicative of interpolation. This method does not address the effects of past compression-decompression on an image.

With the advent of low-cost and high-resolution digital cameras and sophisticated editing software, digital images can be easily manipulated and altered. Digital forgeries, often have no visual clues of tampering and are indistinguishable from authentic photographs. As a result, photographs no longer hold the unique stature as a definitive recording of events. For example, in March of 2003 the Los Angeles Times published, on its front page, a dramatic photograph of a soldier directing an Iraqi citizen to take cover. The photograph, however, was a fake—it was digitally created by splicing together two photographs. This and similar incidents naturally lead one to wonder how many of the images seen every day have been digitally doctored. For more on digital forgeries.

While digital watermarking techniques have been proposed to authenticate images, the markings produced by these techniques have to be planted in the original images in advance. The markings are also susceptible to image processing operations, which may render the markings undetectable. There is therefore a need for a technique for detecting traces of digital tampering in the complete absence of any form of digital watermark or signature.

Although digital forgeries may leave no visual clues of having been tampered with, they may, nevertheless, alter the underlying statistics of an image. For example, consider the creation of a digital forgery that shows a pair of faces in the same image. Such an image could have been manufactured by compositing, such as, splicing a face from one original photograph and resampling it to match the composition of the destination image and inserting it. In order to create a convincing match, it is often necessary to resize, rotate, or stretch portions of the images. This process requires re-sampling or interpolating the original image onto a new sampling lattice. Although this resampling is often imperceptible, it modifies the statistical relationships of image pixel values, which when detected can be used as evidence of digital tampering. "Exposing digital forgeries by detecting traces of resampling", A. C. Popescu and H. Farid, *IEEE Transactions on Signal Processing*, Vol. 53, No. 2, pages 758-767, 2005 is directed to detecting resampling due to forgeries.

Most digital images are either stored in compressed form or have gone through image compression at some point of its life. A number of block-based image compression techniques are known. The most common form of image compression is JPEG compression. Another block-based image compression is vector quantization (See R. M. Gray, "Vector Quantization," *IEEE ASSP Magazine*, pages 4-29, (April 1984).) Block-based image compression produces artifacts that pose a challenge to the detection of digital watermarking and interpolation detection in images that have a history of having been compressed.

U.S. Pat. No. 6,643,410 to Yu et al., which is hereby incorporated herein by reference, discloses a method for detecting the extent of blocking artifacts in a digital image.

It would thus be desirable to provide methods and systems for detecting compositing, which can detect image interpolation even if an image was previously compressed.

SUMMARY OF THE INVENTION

The invention is defined by the claims. The invention, in broader aspects, provides a method and system for detecting digital image compositing, in which a first artifact is detected in an uncompressed digital image. The first artifact is characteristic of an earlier compression of the digital image with a predetermined compression algorithm. An interpolation marker in the image is evaluated to provide interpolation results. During the evaluating, a second artifact of the compression algorithm is counteracted. The image is classified responsive to the interpolation results. The first artifact can be a blocking artifact and the second artifact and interpolation marker can be different periodicities in the image.

The present invention is directed to overcoming one or more of the problems set forth above. It is an advantageous effect of the invention that improved methods and systems are provided for detecting compositing, which can detect image interpolation even if an image was previously compressed.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the methods and systems of the invention, digital image compositing is used to detect if a digital image has been resampled by interpolation, even if the resampling occurred prior to image compression. (Unless apparent from context to the contrary, it can be assumed that image compression is discussed here in a broad sense that is inclusive of steps that both encode and decode a digital image.) This results in a classification of a particular image as interpolated, if the image has been resampled by interpolation, or as non-interpolated, if the image has not been not resampled. In particular uses, the classification between interpolated and non-interpolated is equivalent to a classification between "forgery" and "non-forgery". The method and system, thus, have applicability to the detection of counterfeits or forged images prepared for malicious intent, in addition to use in identifying legitimate images that, as a result of earlier resampling, are unsuitable for particular image processing techniques.

In the following description, the invention or some parts of the present invention will be described as software programs. Those skilled in the art will readily recognize that the equivalent of such software can also be constructed in hardware.

Because image manipulation algorithms and systems are well known, the present description will be directed in particular to algorithms and systems forming part of, or cooperating more directly with, the method in accordance with the present invention. Digital still and video camera and database hardware features are likewise well known, and the present description is generally limited to those aspects directly related to the method of the invention. Other aspects of such algorithms and apparatus, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 14:
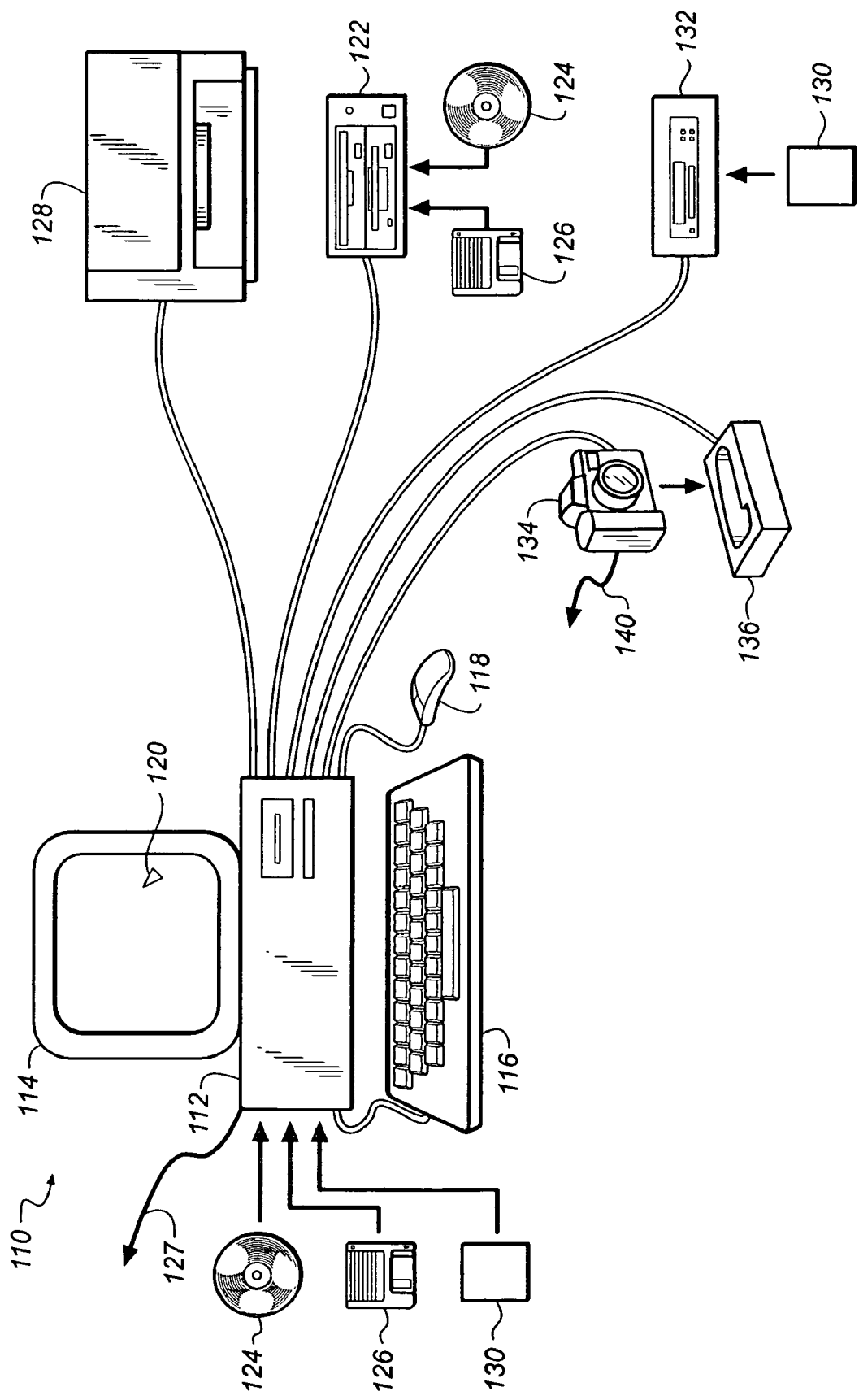
FIG. 14 is a semi-diagrammatical view illustrating physical components of the system of FIG. 1.

The present invention can be implemented in computer hardware and computerized equipment. For example, the method can be performed using a system including one or more scanners or other capture devices and one or more personal computers. Referring to FIG. 14, there is illustrated a computer system 110 for implementing the present invention. Although the computer system 110 is shown for the purpose of illustrating a preferred embodiment, the present invention is not limited to the computer system 110 shown, but may be used with any electronic processing system such as found in digital cameras, cellular camera phones and other mobile devices, home computers, kiosks, retail or wholesale photofinishing, or any other system for the processing of digital images. The computer system 110 includes a microprocessor-based unit 112 (also referred to herein as a digital image processor) for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

Removal memory, in any form, can be included and is illustrated as a compact disk-read only memory (CD-ROM) 124, which can include software programs, is inserted into the microprocessor based unit for providing a means of inputting the software programs and other information to the microprocessor based unit 112. Multiple types of removal memory can be provided (illustrated here by a floppy disk 126) and data can be written to any suitable type of removable memory. Memory can be external and accessible using a wired or wireless connection, either directly or via a local or large area network, such as the Internet. Still further, the microprocessor-based unit 112 may be programmed, as is well known in the art, for storing the software program internally. A printer 128 or other output device can also be connected to the microprocessor-based unit 112 for printing a hardcopy of the output from the computer system 110. The microprocessor-based unit 112 can have a network connection 127, such as a telephone line or wireless link, to an external network, such as a local area network or the Internet.

Images may also be displayed on the display 114 via a memory card, such as a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112. The present invention can be used with multiple capture devices that produce digital images. For example, FIG. 14 can represent a digital photofinishing system or kiosk having a scanner.

The output device provides a final image or output signal. The output device can be a printer or other output device that provides a paper or other hard copy final image. The output device can also be an output device that provides the final image as a digital file. The output device can also include combinations of output, such as a printed image and a digital file on a memory unit, such as a CD or DVD.

A digital image includes one or more digital image channels or color components. Each digital image channel is a two-dimensional array of pixels. Although a digital image channel is described as a two dimensional array of pixel values arranged by rows and columns, those skilled in the art will recognize that the present invention can be applied to non rectilinear arrays with equal effect and that the present invention can be applied to, but is not limited to, a digital image channel for any of the herein-mentioned applications.

As used herein, the term "digital image" refers to the two-dimensional arrays of all of the channels, or any individual array, or any portion of an array that is treated separately. Each frame of an image sequence, such as a video sequence, is also considered a "digital image".

For convenience, digital images are generally discussed herein in terms of either a two-dimensional array of red, green, and blue pixel values or an array of monochromatic values corresponding to light intensities. A convenient resolution for purposes of discussion is an image of 1024 rows of pixels and 1536 lines of pixels, although those skilled in the art will recognize that digital images of different resolutions and dimensions may be used with equal, or at least acceptable, success. The same is true of other combinations of image channels.

With regard to matters of nomenclature, the value of a pixel of a digital image located at coordinates (x,y), referring to the $x^{th}$ row and the $y^{th}$ column of the digital image, shall herein comprise a triad of values [r(x,y), g(x,y), b(x,y)] respectively referring to the values of the red, green and blue digital image channels at location (x,y). In this regard, the digital image is considered to comprise red, green, and blue two-dimensional arrays or red, green, and blue channels. A luminance channel p can be formed from the color channels. The value of a pixel of a digital image channel n located at coordinates (x,y), referring to the $x^{th}$ row and the $y^{th}$ column of the digital image channel, shall herein be a single value referred to as p(x,y).

The general control computer shown in FIG. 14 can store a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program can also be stored on any other physical device or medium employed to store a computer program indicated by offline memory device.

It should also be noted that the present invention can be implemented in a combination of software and/or hardware and is not limited to devices, which are physically connected and/or located within the same physical location. One or more of the devices illustrated in FIG. 3 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., camera, PDA or cell phone that can be used as a processing unit, a display unit, or a unit to give processing instructions), and as a service offered via the World Wide Web.

In each context, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

Figure 1:
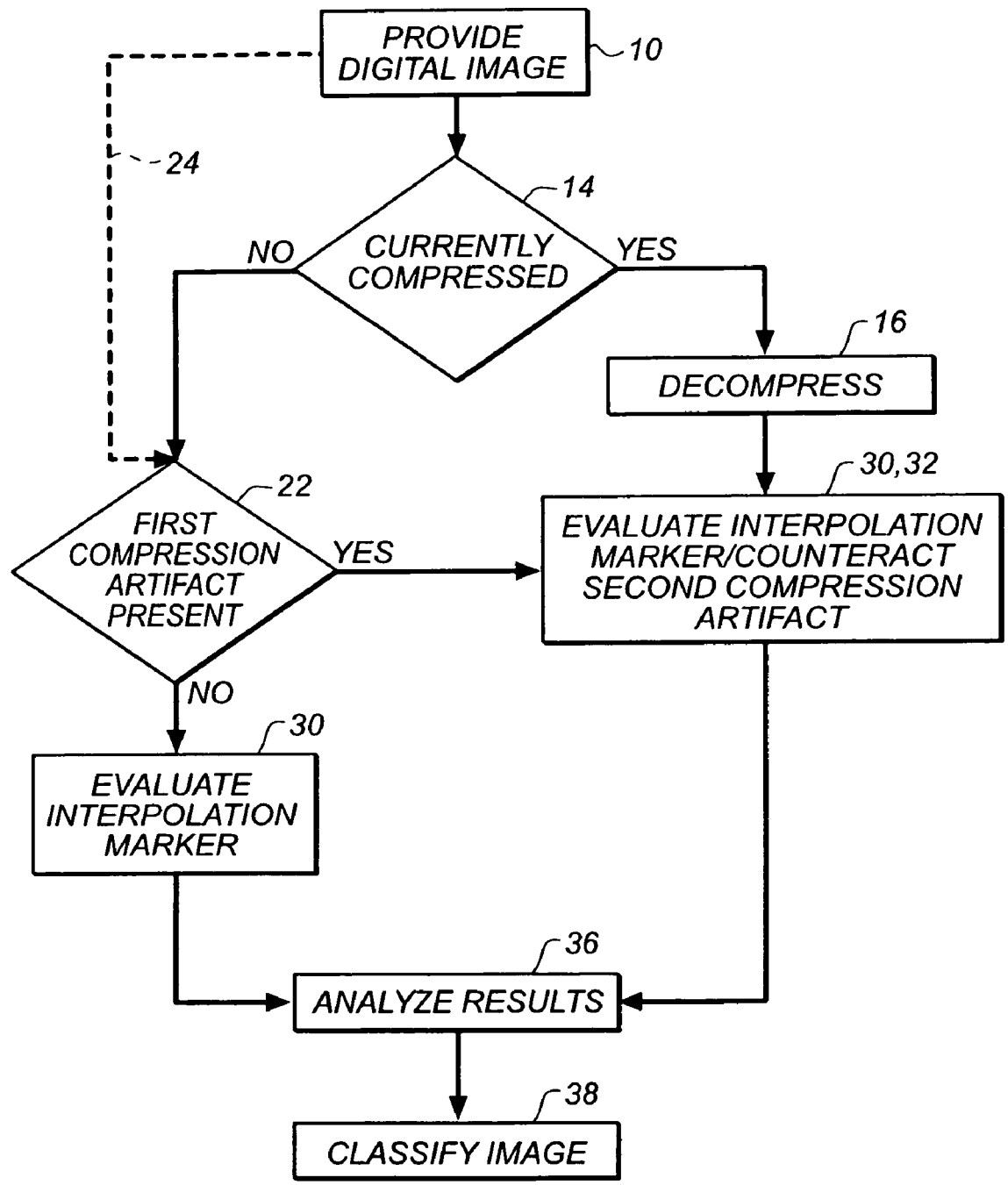
FIG. 1 is a flow chart of an embodiment of the method.
Figure 2:
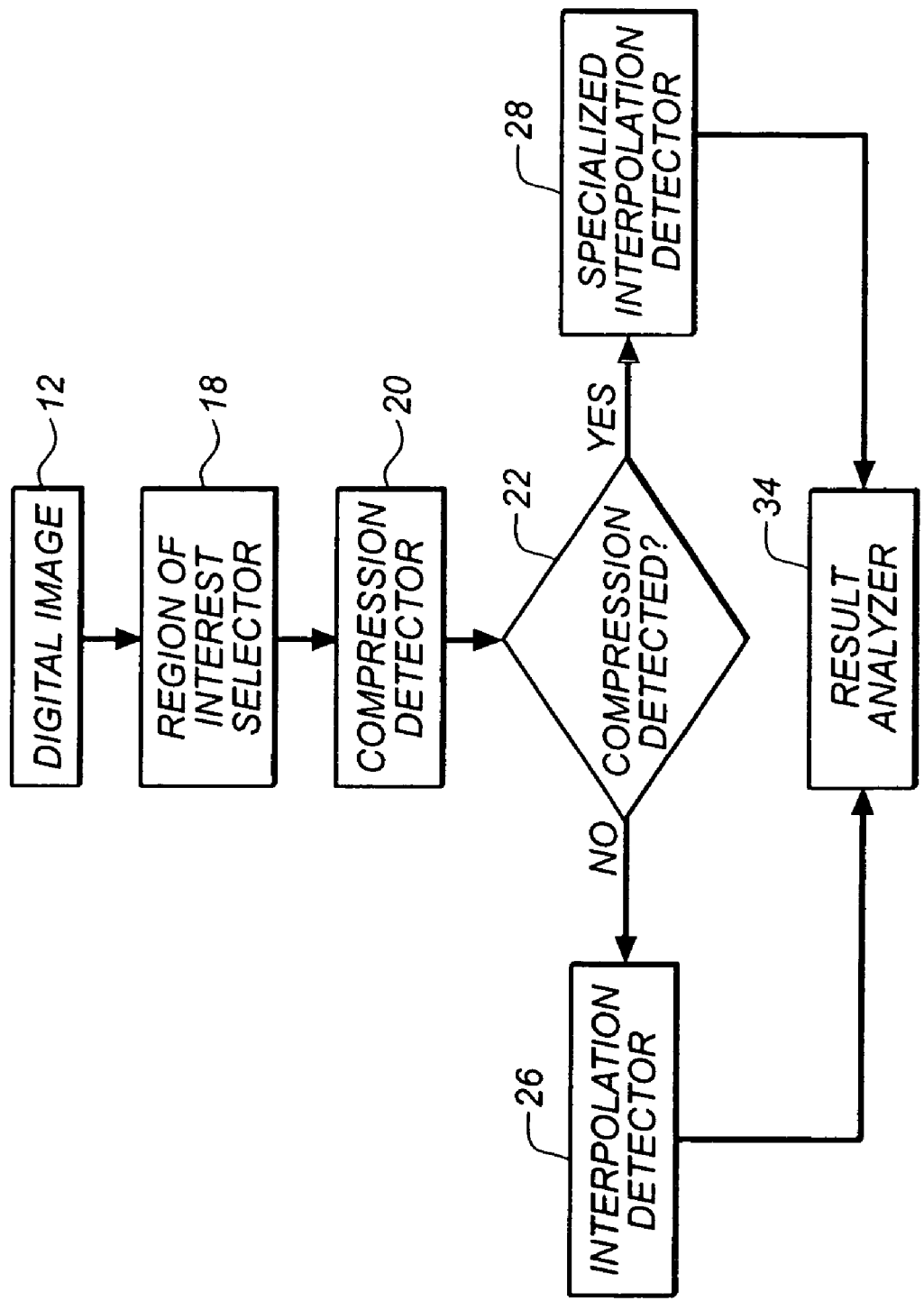
FIG. 2 is a diagrammatical view of an embodiment of the system. Only logical components corresponding to the features of the method of FIG. 1 are shown.

Referring now to FIGS. 1-2, in a particular embodiment a digital image is provided (10) to a unit 12 of system memory and a determination (14) is made as to whether the digital image is currently compressed. If the digital image is found to be compressed, the digital image is decompressed (16). Protocols for determining whether images are currently compressed are well known to those of skill in the art. For example, digital images can be provided as digital files that include image information along with metadata indicating the status of the final as compressed or non-compressed, along with information necessary to decompress the image and other metadata related to the image.

Referring now to FIG. 2, the digital image can be sent next to a region of interest selector 18, discussed in detail below, which determines a region of interest. The region of interest selector can be bypassed at the selection of the user, in which case, the entire image is used. Alternatively, the region of interest selector can be omitted from the system, as shown in the embodiment of FIG. 1.

Referring again to both FIGS. 1 and 2, a digital image not known to have been earlier compressed, is next sent to a compression detector 20 and a determination (22) is made whether the image has undergone compression at some point in its history. This is done by determining whether a first compression artifact is present. This first compression artifact is a blocking artifact resulting from a block-based compression technique. A number of block-based image compression techniques are known. The most common form of image compression is JPEG compression under the JPEG standard. Another block-based image compression is vector quantization, such as the method disclosed in "Vector Quantization", R. M. Gray, *IEEE ASSP Magazine*, pages 4-29, (April 1984).

An alternate path (24), which sends the digital image directly to compression detection (22) is indicated by a dashed arrow in FIG. 1. This alternate path (24) is useful if provided images are known to be uncompressed. For example this can be useful if images are received following earlier image processing that decompresses images or excludes compressed images. The alternative path can be provided as a selection, either automatic, based upon earlier image processing or the like or as a user option, for example, when the user knows that all the images in a large batch are uncompressed. If it is known that all images that will be received will be uncompressed at the time of receipt, then the steps of determining whether an image is compressed and decompressing that image can be omitted.

If compression is not detected, the digital image is sent to a first interpolation detector 26. If compression is detected, the digital image is sent to a second, specialized interpolation detector 28. The presence of an interpolation marker in the digital image is evaluated (30) in both of the interpolation detectors. In the second interpolation detector only, the effects of a second compression artifact are counteracted (32). Results of the interpolation evaluations are sent to a result analyzer-classifier 34, which analyzes (36) the results and then classifies the digital image.

The presence of a blocking artifact in a digital image can be determined by a variety of techniques, such as are disclosed in U.S. Pat. Nos. 6,427,031 and 6,643,410. (U.S. Pat. No. 6,427,031 is hereby incorporated herein by reference.) A currently preferred method is disclosed in U.S. Pat. No. 6,643,410, to Yu et al, which is described in relation to a grayscale image having an intensity component or a color image having RGB components. For color images, a color transform can be performed before image compression to take advantage of the redundancy in the color perception of the human visual system (HVS). For example, in JPEG compression, a color image is first converted from RGB to YCbCr color space with the following equations:

$$Y=16+65.481*R+128.553*G+24.966*B;$$

$$Cb=128-37.797*R-74.203*G+112*B;$$

$$Cr=128+112*R-93.786*G-18.214*B;$$

where:
Y is the intensity component,
Cb and Cr are the two chrominance components, and
R, G and B are all normalized to 1.

Figure 5:
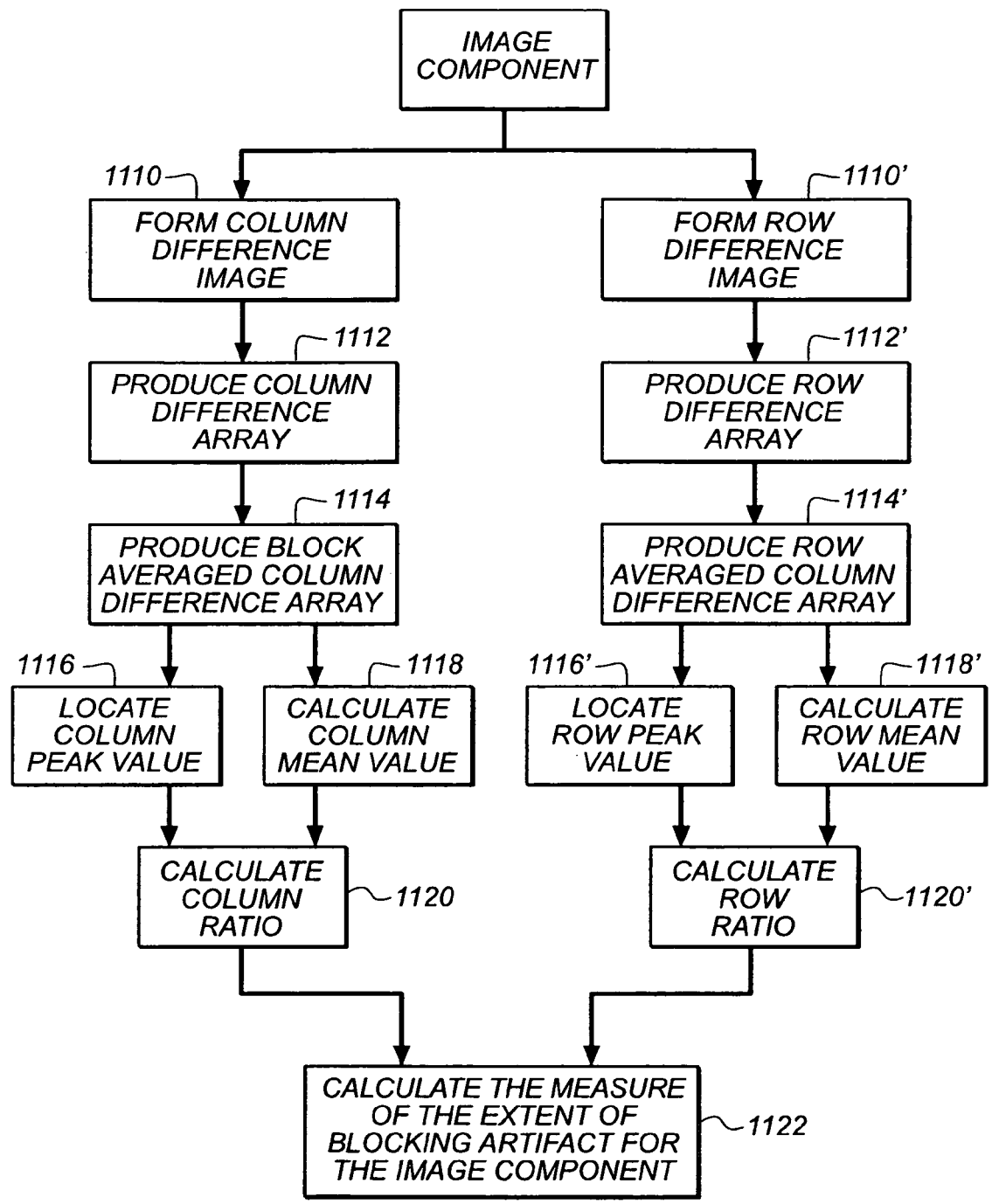
FIG. 5 is a flow chart of the procedure used by the compression detector of FIG. 2.

FIG. 5 illustrates use of the procedure of U.S. Pat. No. 6,643,410 to detect a JPEG compression blocking artifact. The procedure can also be used to detecting other block-based image compression, such as vector quantization. For each image component, a column difference image is first generated in step 1110 by calculating the absolute difference between two adjacent columns. For example, the column difference image is generated by subtracting the pixel values of the second column of the image from the pixel values of the first column of the image to generate a column of difference values, and then setting the pixel values of the first column of the column difference image as the absolute values of the column of difference values. The same procedure is repeated to set the rest of the columns of the column difference image except for the last column, where all the values of that column are set to zero.

The column difference image is further averaged in the vertical direction to generate a one-dimensional column difference array VA in a step 1112. Assuming that the original image has M rows and N columns of image data, the column difference array VA should have N entries. To keep image edges from contributing to the detection, the contribution of a pixel in the column difference image is discarded if the magnitude of the intensity gradient of the corresponding pixel in the original image component is larger than a threshold value T. Sobel operators are used as the intensity gradient operators to generate an intensity gradient image with the intensity gradient equal to the sum of the absolute values from the horizontal and vertical Sobel operators. In the current embodiment of the invention, the standard deviation (SD) of the intensity gradient image is calculated, and the threshold value T is set as twice the standard deviation SD.

The column difference array VA is further averaged using a periodicity of the JPEG block width in a step 1114 to generate a block averaged column difference array VAA, which has eight entries. In other words, every eighth entry of the column difference array VA will be averaged, and the result will be used to set the eight entries of the block averaged column difference array VAA. According to the common use of JPEG image compression, the block size is 8×8 pixels. Alternatively, a 16×16 block can be used. Similarly, other block dimensions can be used in other block-based compression schemes.

From the block averaged column difference array VAA, the maximum value is first located in a step 1116 and defined as the column peak value, then the mean value of the block averaged column difference array VAA is calculated in a step 1118 excluding the peak value. The mean value is defined as the column base value. Finally, the ratio between the column peak value and the column base value is calculated in a step 1120 to generate a column ratio.

The row peak value, row base value and row ratio are also calculated analogously in the series of steps 1110'-1120', where the common reference numerals indicate that the respective operations performed on the rows are analogous to the operations performed on the columns. More specifically, a row difference array HA and a block averaged row difference array HAA are generated in the block 1112' and 1114', respectively, and similar measures based on these arrays are developed in the blocks 1116'-1120'.

The column and row ratios are good indicators of the presence of the blocking artifacts in the column and row directions, respectively. Therefore, a preferred measure (calculated in a step 1122) for the extent of blocking artifacts is the average values of the column and row ratios for images with statistically equally distributed horizontal and vertical structures. A more aggressive measure is the minimum value of the column and row ratios.

The visibility of the blocking artifacts may depend on the actual structure in an image. For example, textured areas tend to hide the blocking artifacts better than flat areas. The column and row base values are good indicators of the amount of textures. To achieve a higher degree of robustness, the measure of the extent of the blocking artifacts can be defined as a function of both the column/row ratios and the column/row base values. In general, the higher the base values, meaning a higher degree of texture activity (capable of hiding a larger extent of blocking artifacts), a higher threshold on the artifact measure should be used. In practice, a look-up-table can be built to quantitatively characterize the relationship between the base values and the threshold.

If the measure for the extent of blocking artifacts exceeds a predetermined threshold, JPEG compression is detected. Furthermore, the indexes of peak value in the block averaged column difference array VAA and the block averaged row difference array HAA are the JPEG block boundary locations in the horizontal and vertical directions for the image component. For example, if the index for the peak value in the block averaged column difference array VAA is 4, then it is assumed that JPEG block boundary will appear at column no. 4, 12, . . . , in the image component. (Note that the indexes for the columns of the image component as well as for the block averaged column difference array VAA and the block averaged row difference array HAA start at zero in this embodiment.)

In the case in which digital images are not only cropped but also zoomed (shrunk or magnified) after an original data compression operation, the block size is no longer the original JPEG block size of 8. For potentially magnified digital images, the above process for determining the extent of the JPEG blocking artifacts can be repeated for a predetermined series of hypothetical block width values to produce a series of ratios between the peak value and the base value. The hypothetical block width that produces the maximum artifact measure is chosen to be the effective block size after zooming. The zooming factor is in turn determined to be the ratio between the effective block size and the original block size (i.e., 8).

Digital images having a compression-induced blocking artifact also suffer from a second artifact that presents as a particular periodicity in the image data. Both artifacts are characteristic of the particular compression scheme earlier used on the digital image. Thus, detection of the first artifact evidences the existence of the second artifact in the image. In the method and system of the invention, the detection of the presence of the first artifact of a particular compression scheme, is assumed to establish use of that compression scheme and existence of the associated second artifact in the digital image. It is recognized that blocking artifacts can potentially be produced by other procedures unrelated to compression; however, it has been determined that, as a practical matter in most uses, the existence of a blocking artifact characteristic of a particular compression scheme can be considered conclusive proof of past use of that compression scheme or an equivalent compression scheme rather than a technique unrelated to compression.

The interpolation detectors evaluate an interpolation marker to provide interpolation results. The interpolation results can be binary or can provide an interpolation factor. The subsequent classification of a particular digital image can, likewise, be a binary classification of detection or non-detection or can provide a value on multipoint scale, such as a probability that the digital image is or is not interpolated. JPEG compression often has an effect similar to interpolating an image by a factor of 8 in each dimension. When moderate or large quantization is implemented by the JPEG encoding, the present invention will often classify an image as having been interpolated by a factor of 8.

Both interpolation detectors evaluate periodicity in a particular digital image. The second detector also counteracts a periodicity present in the digital image as a result of its earlier compression, that is, the second artifact. The counteracting is performed by excluding the periodicity due to the second artifact from the consideration of interpolation. This compromises the second detector slightly relative to the first detector but eliminates spurious signals resulting from the image compression rather than interpolation. Since the operation of the second detector is slightly compromised relative to the first detector, it is undesirable and unnecessary to use the second interpolation detector with images that have never been compressed.

The first interpolation detector can operate in the manner disclosed in U.S. Pat. No. 6,904,180, which is illustrated in FIGS. 8-11. Referring to the overview of the interpolation detector shown in FIG. 8, a digital image channel p(x,y) is input to the signal generator 210. The digital image channel p(x,y) falls either into the category of a non-interpolated image or an interpolated image. The digital image channel p(x,y) is an interpolated image if it has been derived from some other source digital image channel m(x,y) and if the sampling rate of p(x,y) is higher than the sampling rate of m(x,y). In addition, the digital image channel p(x,y) will generally be of greater size (in terms of number of pixels in the digital image channel) than the source digital image channel m(x,y), unless a cropping step is involved. The input image channel signal generator 210 creates and outputs a one-dimensional signal mddp(k) from the input digital image channel p(x,y). If the digital image channel p(x,y) is the result of an interpolation operation prior to being input to the signal generator 210, then the signal mddp(k) contains a periodicity corresponding to the interpolation factor N and method, as will be further explained hereinbelow. However, if the digital image channel p(x,y) is a non-interpolated digital image channel, then the signal mddp(k) will not contain any particular periodicities. The purpose of the signal generator 210 is to generate a signal that contains a periodic component corresponding to the interpolation factor N only if the input digital image channel p(x,y) had been interpolated. The signal generator 210 will be described in greater detail hereinbelow. Note that the input digital image channel p(x,y) consists of R rows of pixels and C columns of pixels.

The digital signal mddp(k) output from the signal generator 210 is input to the DFT computer 216 for the computation of the Discrete Fourier Transform. The Discrete Fourier Transform of a time or space signal is a frequency domain representation of the signal. Periodicity in the mddp(k) signal may be determined by looking for peaks in the DFT[mddp (k)] signal output by the DFT computer 216. The Discrete Fourier Transform of the mddp(k) signal, DFT[mddp(k)], is input to the interpolation determiner 222 for analysis. The computation of the Discrete Fourier Transform is well known in the art of signal processing and will not be further discussed. In the preferred embodiment, the mddp(k) signal is padded with zeros until its length is a power of 2. The number of samples of the DFT will herein be referred to by M, where M is the smallest power of 2 equal to or greater than C−2.

The DFT[mddp(k)] signal input to the interpolation determiner 222 is analyzed to determine if significant peaks exist. The existence of peaks in the DFT[mddp(k)] signal indicates that the digital image channel p(x,y) is an interpolated digital image channel. The output of the interpolation determiner is an indication of whether or not the image p(x y) is an interpolated digital image channel as well as an indication of the interpolation factor N in the case that p(x,y) is an interpolated digital image channel. The operation of the interpolation determiner 222 is described below.

Figure 11:
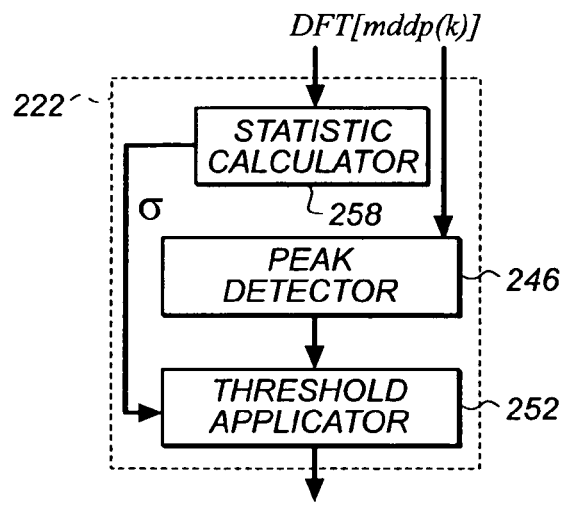
FIG. 11 is a block diagram of the interpolation determiner of FIG. 8.

The interpolation determiner 222 accepts as input the signal DFT[mddp(k)]. The interpolation determiner 222 examines the magnitude of the input signal to determines if any peaks are present. FIG. 11 shows a detailed view of the interpolation determiner illustrating a peak detector 246, which locates the peaks of the input signal DFT[mddp(k)], and a threshold detector 252, which compares the magnitude of the peak detector output signal against certain thresholds. Many peak detection methods exist. Those skilled in the art will recognize that any number of peak detection algorithms may be used by the peak detector 246 in order to determine the location $k_o$ of the largest peak of the signal DFT[mddp(k)]. In the preferred embodiment, for a location $k_o$ to be classified as a peak, $k_o$ must be between M/x−1 and M/2+1, where x=12 in the preferred embodiment. Additionally the magnitude of the signal DFT[mddp(k)] must be greater than the magnitude at all locations within (M)/12 samples of $k_o$. Furthermore, the threshold applicator 252 requires that the magnitude of the signal DFT[mddp(k)] must be greater than Tσ, where σ is the standard deviation of the magnitude of the DFT[mddp(k)] signal, evaluated between (M)/12−1 and (M)/2+1. The value of σ is determined by the statistic calculator 258. Those skilled in the art will recognize that many variations of the statistic calculator 258, for example Mean Absolute Deviation rather than standard deviation, will yield acceptable results. T is an arbitrary constant. In a particular embodiment, T=4. The value of $N_{est}$, the estimate of the interpolation factor N, is determined with the location of the peak $k_o$ corresponding to the greatest magnitude. If the interpolation determiner 222 finds no peaks associated with the signal DFT[mddp(k)], then the interpolation determiner outputs information indicating that it believes that the digital image channel p(x,y) has not been interpolated. Alternatively, if the interpolation determiner 222 finds one or more peaks, then the interpolation determiner 222 outputs information indicating that it believes that the digital image channel p(x,y) has been interpolated. Additionally $N_{est}$ is output by the interpolation determiner 222. The value of $N_{est}$ is found with the following formula, where $k_o$ is the index of the peak and M is the number of samples in the DFT[mddp(k)] signal:

$$N_{est}=k_o/M$$

Note that in regard to indexes of the DFT, the index 0 refers to the first sample of the DFT and is the DC term.

Figure 9:
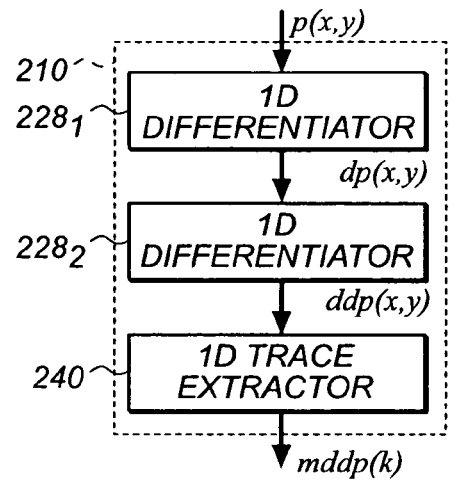
FIGS. 9 and 10 are block diagrams showing two alternatives of the signal generator shown in FIG. 8.

FIG. 9 shows a detailed block diagram of the signal generator 210. As previously explained, the purpose of the signal generator 210 is to extract a signal from the digital image channel which will exhibit a periodic property only if the digital image channel is interpolated. The digital image channel p(x,y) is input to the 1D differentiator $228_1$. The purpose of the 1D differentiator $228_1$ is to calculate local pixel to pixel variations within the image. In a particular embodiment, these pixel to pixel differences are determined by computing two successive derivatives along each row of the digital image channel. Note that the processing may be performed with equal success along the image columns. The 1D differentiator $228_1$ computes the derivative of each row of the digital image channel to create a derivative digital image channel dp(x,y). The following formula is used by the 1D differentiator $228_1$ to create the derivative digital image channel dp(x,y).

$$dp(x,y)=p(x+1,y)-p(x,y)$$

Next, the derivative digital image channel dp(x,y) is input to a second 1D differentiator $228_2$ for a second computation of a derivative of each row. The output of this second 1D differentiator $228_2$ is a digital image channel representing the second derivative of each row of the digital image channel p(x,y). The following formula is used by the 1D differentiator $228_2$ to create the second derivative digital image channel ddp(x,y):

$$ddp(x,y)=dp(x+1,y)-dp(x,y)=\\p(x+2,y)-2p(x+1,y)+p(x,y)$$

Notice that the two stages of 1D differentiators 228 may be combined to a direct calculation of ddp(x,y) from p(x,y) as shown in the preceding equation.

The purpose of the two stages of the 1D differentiators 228 is to generate a two dimensional signal where the value of the signal on average has different properties at pixel locations corresponding to samples of the original digital image channel m(x,y) (from which p(x,y) was interpolated). The signal ddp(x,y) generally has a large average value at locations corresponding with samples of the original digital image channel m(x,y) and a small average value at locations between samples of the original digital image channel.

The ddp(x,y) signal is then input to the 1D trace extractor 240. The purpose of the 1D trace extractor is to produce a high signal to noise ratio one-dimensional trace from the ddp(x,y) signal, which exhibits a periodicity directly related to the interpolation factor N. In the preferred embodiment, the 1D trace extractor 240 produces a one dimensional trace mddp(k) by averaging the magnitudes of values across columns as shown in the following formula:

$$mddp(k) = \sum_{y=0}^{R} |ddp(k,y)|$$

Those skilled in the art will recognize that the purpose of the signal generator 210 may be accomplished by many methods. Those skilled in the art will further recognize that methods which aim at creating a signal exhibiting a periodicity related to the interpolation factor N from a digital image channel p(x,y) do not deviate from the scope of the present invention.

Figure 10:
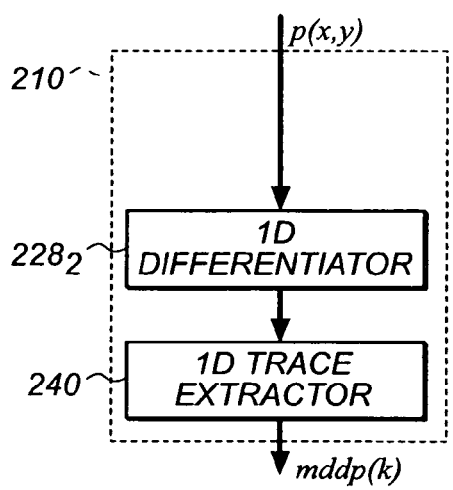

FIG. 10 shows an alternative embodiment of the signal generator 210, wherein only a single 1D differentiator 228 is used. This embodiment yields accurate results, although not quite as reliable as with the preferred embodiment.

Many alternative embodiments exist as well for the 1D trace extractor 240. For instance, the signal mddp(k) may be computed by finding the standard deviations (or variances) of each row or column of the signal input to the 1D trace extractor 240. In general, the variances of columns or rows of the digital image channel input to the 1D trace extractor 240 are highest when the row or column is coincident with samples of the original digital image channel m(x,y) from which p(x,y) was interpolated. Thus, the mddp(k) signal may be computed by the 1D trace extractor 240 by the following variance-based formula:

$$mddp(k) = \frac{1}{R}\sum_{y=0}^{R} ddp(k,y)^2 - \frac{1}{R^2}\left[\sum_{y=0}^{R} ddp(k,y)\right]^2$$

Other alternative embodiments exist by rearranging the block diagrams already shown. For example, it is possible to compute the DFT of each row of the ddp(x,y) signal, and then average these DFTs together in order to create the one dimensional signal to input to the interpolation determiner 222. Likewise, it is also possible to compute the DFT of each row of the ddp(x,y) signal, then input each DFT to the interpolation determiner 222 for peak detection. Each row of the p(x,y) digital image channel would then have an $N_{est}$. These multiple values of $N_{est}$ may then be combined by methods familiar to those skilled in the art of pattern recognition to achieve a single value of $N_{est}$ for the entire image.

The first interpolation detector can successfully detect the interpolation factor N even when N is not an integer value. An alternative method of interpolation detection comprises the steps of essentially selecting samples (at regular intervals) of a digital image channel p(x,y) and proposing that these samples constitute an original image channel. Various method of interpolation may then be utilized to reconstruct the "high resolution" image from the samples. This interpolated version may then be compared with the digital image channel for correlation. A high correlation would indicate that the interpolation method and factor were correctly determined. While this alternative method would intuitively provide the desired result, the detection of an arbitrary non-integer interpolation factor would be difficult.

The second interpolation detector can operate in the same manner as the first interpolation detector, with the exception that the second interpolation detector includes features to counteract the effects of the second artifact second compression artifact. It is currently preferred that need a second interpolation detector operate generally in the manner described above in relation to FIGS. 8-11. In that case, the counteracting of the second artifact can be performed by modifying the signal that is extracted from the image to remove periodicity related to the earlier compression of the image. The modified signal is then examined for evidence of interpolation. In a particular embodiment, the evaluating of interpolation in the second interpolation detector has the steps of: generating a one-dimensional periodicity signal from the image; computing a Discrete Fourier Transform (DFT signal) of the periodicity signal; excluding from the DFT signal peaks corresponding to the second artifact to produce a modified DFT signal; and evaluating the modified DFT signal for the presence of a first set of peaks associated with the type of compression evidenced by the earlier detected blocking artifact.

Figure 3:
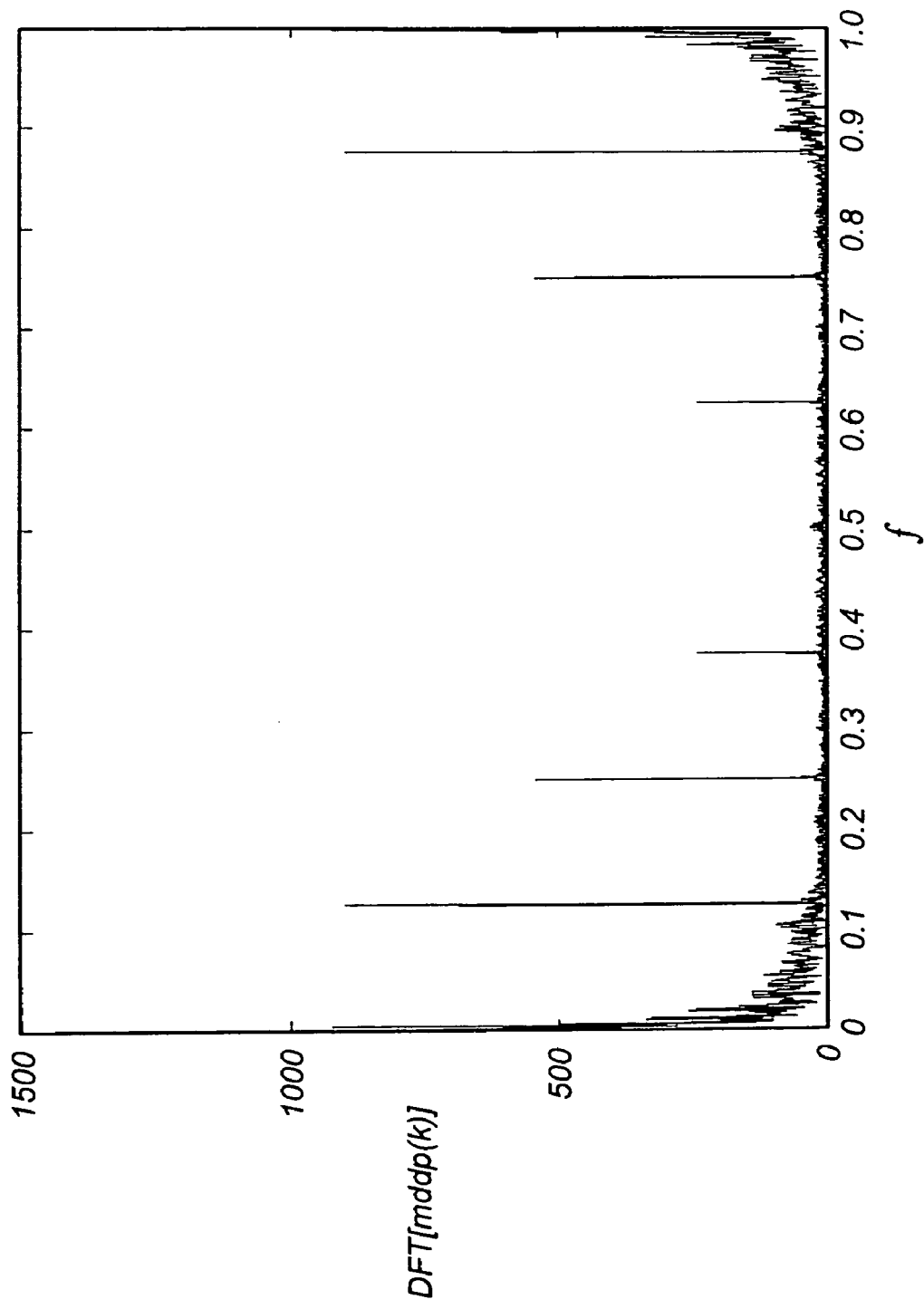
FIG. 3 is a plot of a signal used by the interpolation detectors of FIG. 2 to detect interpolation. This signal is for an image compressed by JPEG but not interpolated.
Figure 4:
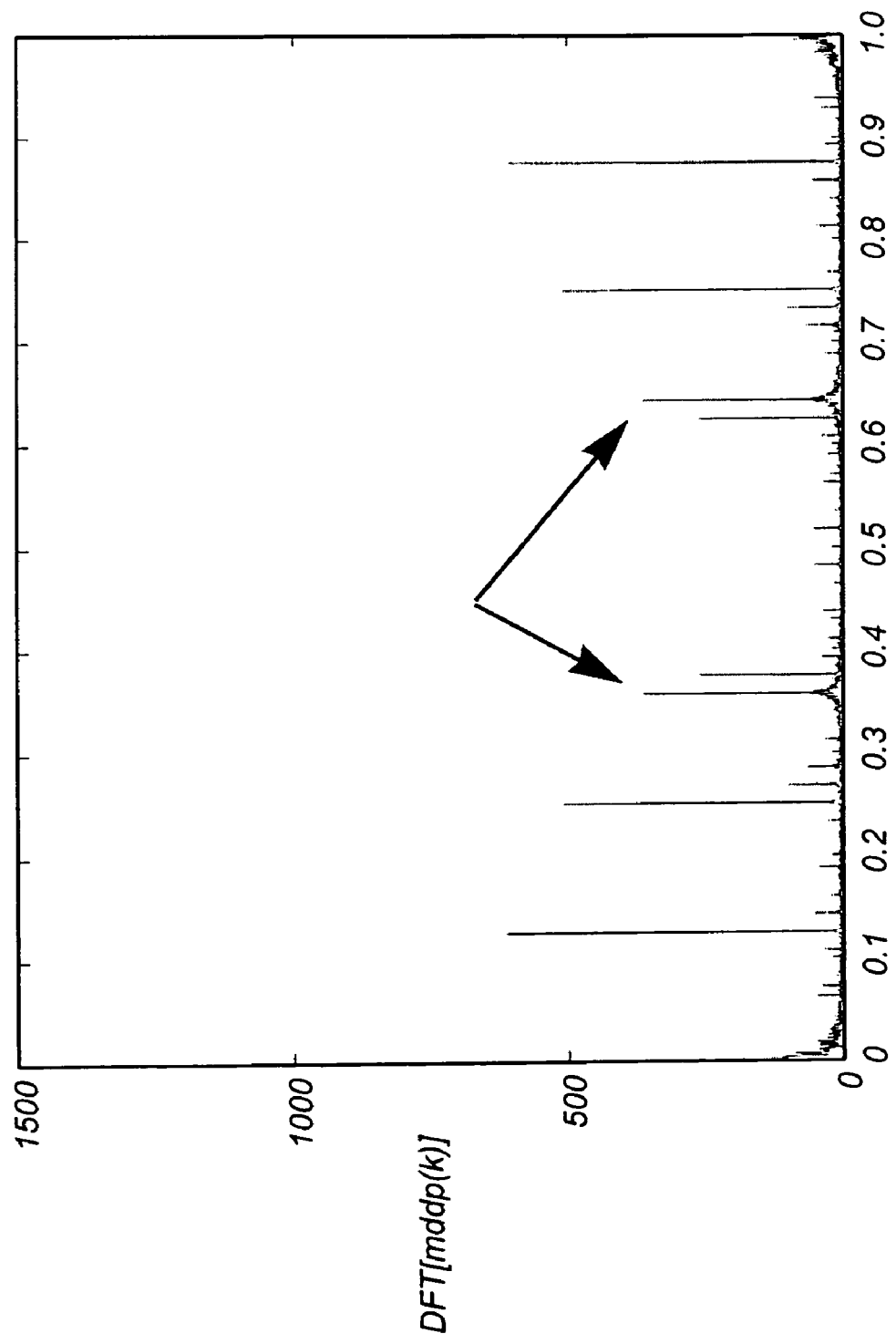
FIG. 4 is a plot of a signal used by the interpolation detectors of FIG. 2 to detect interpolation. This signal is for an image compressed by JPEG and interpolated by a factor of 2.8.

For example when JPEG compression with 8×8 coding blocks is applied to an image, the resulting DFT[mddp(k)] signal shown in FIG. 3) has peaks at 1/8, 1/4, 3/8, 5/8, 3/4, and 7/8 of the spectrum, even when no interpolation has been applied on the image. Therefore, to avoid problems of false detections that could occur by detecting these spurious peaks, the specialized interpolation detector 124 first ensures that the length of the signal mddp(k) is a power of 2 and evenly divisible by 8 so that the energy of the peaks are concentrated on a single point in the DFT[ ] signal. Then, the value of the DFT[mddp (k)] is set to be 0 at the positions 1/8, 1/4, 3/8, 5/8, 3/4, and 7/8 of the spectrum. This allows peaks associated with actual interpolation to be detected while the peaks associated with the image compression are ignored. However, the detection of interpolation rates of 8, 4, 8/3, 8/5, 4/3, and 8/7 is made more difficult. FIG. 4 shows an example DFT[mddp(k)] signal associated with an image interpolated by a factor 2.8, then subjected to JPEG compression. By ignoring the peaks associated with JPEG compression, the peaks associated with the interpolation (indicated by arrows) are correctly identified.

In a less likely event where the JPEG coding block is not 8×8, e.g., 16×16, such information can be obtained by the compression detector 110 and passed on to the specialized interpolation detector 124. In this example, the resulting DFT [mddp(k)] signal would have peaks at 1/16, 1/8, 3/16, 1/4, 5/16, 3/8, 7/16, 9/16, 5/8, 11/16, 3/4, 13/16, 7/8 and 15/16 of the spectrum.

As earlier discussed the classification provided in the method can be between genuine or non-forgery images and forgery images. Other classifications can also be provided. The classification can be used in order to select between different parameter sets. For example, a sharpening algorithm may require one set of parameters if the input image is non-interpolated and a second set of parameters if the input image has been interpolated. The classification can determine metadata to be associated with the image. For example, if a digital image channel p(x,y) has been interpolated by a factor of 4, then this historical information may be appended to the metadata associated with that digital image channel. Metadata can be, but is not necessarily stored in the same file as is the digital image channel data.

Figure 12:
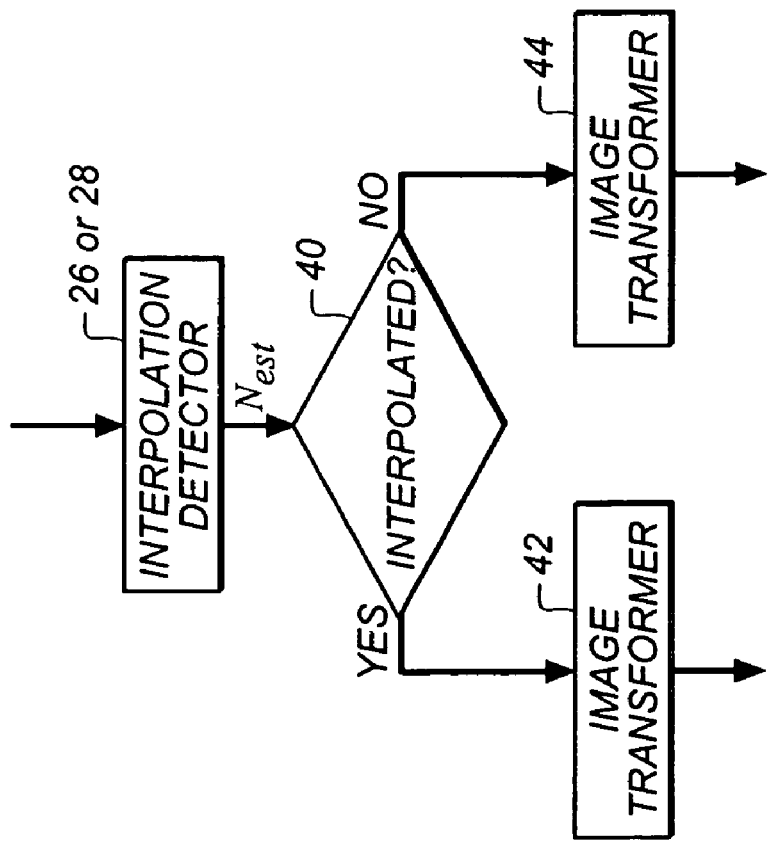
FIG. 12 is a block diagram of an image processing chains, which has several branches and utilizes the output of the interpolation detection method of FIG. 8.

FIG. 12 shows an image processing chain with a branching step, where the selection (40) of an image processing path to an image transformation procedure 42 or 44, from one of the two branches is based on the output of the respective interpolation detector. For example, many web photofinishing sites contain resolution warnings when a consumer requests a photograph print at a resolution of less than 150 dpi. An uninformed consumer may attempt to avoid this warning by using image processing software to interpolate the image and increase the image resolution, believing that the problem causing the "resolution warning" has been solved. The method of the present invention would recognize that the image had been interpolated and allows a system to issue a resolution warning to the consumer. Additionally, the method of the invention allows a system to educate the consumer in order to explain that while interpolation increases the number of pixels in a digital image channel, new information is not generally introduced.

Figure 13:
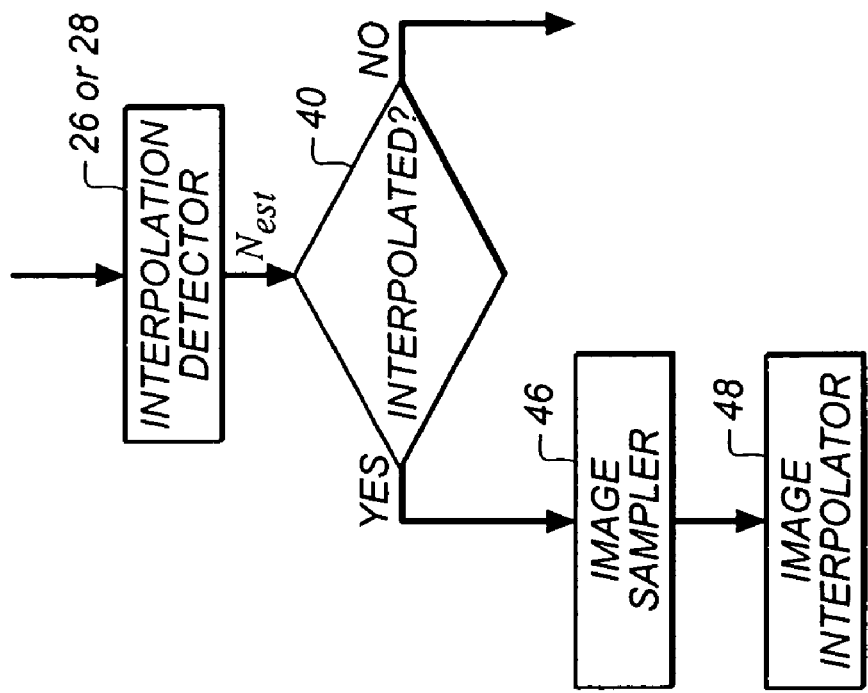
FIG. 13 is a block diagram of another image processing chain, which includes recovery of the original digital image signal from the output of the interpolation detection method shown in FIG. 8.

Another application of the present method of detecting an interpolated image is illustrated in FIG. 13. As previously mentioned, image interpolation is commonly performed by bicubic and bilinear interpolation. However, a plethora of algorithms exist which claim to provide improved image interpolation. For example, often times, interpolation by an integer factor of N when using either bicubic or bilinear interpolation preserves the values of each sample of the digital image channel m(x,y) in the image p(x,y). The method can then be used to indicate when the image p(x,y) is an interpolated image. In the case that it is, then the original digital image channel m(x,y) may often be recovered exactly when N is an integer. This is accomplished by sampling the image p(x,y) at a rate indicated by $N_{est}$ with an image sampler 46. The low resolution version p(x,y) may then be interpolated up to the image dimension of p(x,y) with an image interpolator 48 using a more advanced image interpolation algorithm than would have been previously used.

As earlier mentioned, the digital image can be a region of interest in a larger image. The regions of interest can be determined automatically using a region of interest selector or manually by an operator. The region of interest selector can alternatively or additionally, select and present one or more regions of interest to the user on a graphical user interface, who can then make a selection among the regions presented, manually select a region, or select the entire image. The manner of presentation of the regions to the user is not critical. For example, regions can be visibly outlined.

The region of interest selector can operate on the entire image or a scanning window in various sizes can slide across the digital image to automatically find the region of interest. Various region of interest selectors can be used, such as: face detectors, main subject detectors, skin region detectors, sky detectors, other object (cars, pavement, grass, buildings, etc.) detectors, or combinations of these detectors.

The region of interest selector selects both one or more regions of interest and, optionally, a comparison region or regions. The comparison region or regions may or may not be of lesser interest or in the background of the image. In uses detecting forgery, it is sometimes preferred that the comparison region is background or a manually selected region that is less likely to have been interpolated than the region of interest. This is generally part of the background of the image. In some uses, it is convenient to compare interpolation results from two or more selected regions of interest. After the interpolation evaluations of all or the images, the interpolation results are analyzed individually or together or both. In the analysis, the interpolation results for a region of interest can be compared to the interpolation results for a comparison region to determine if there is a difference in results. The difference in the response of the same interpolation detector for two different "images indicates" from the same large image, is evidence of the presence of image composition from more than one source.

Figure 7:
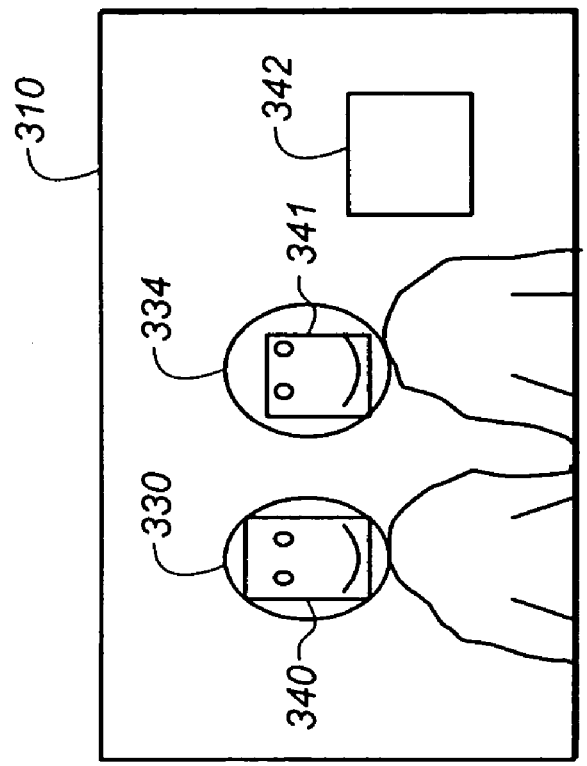
FIG. 7 is the same view as FIG. 6, but regions of interest are shown by boxes.
Figure 6:
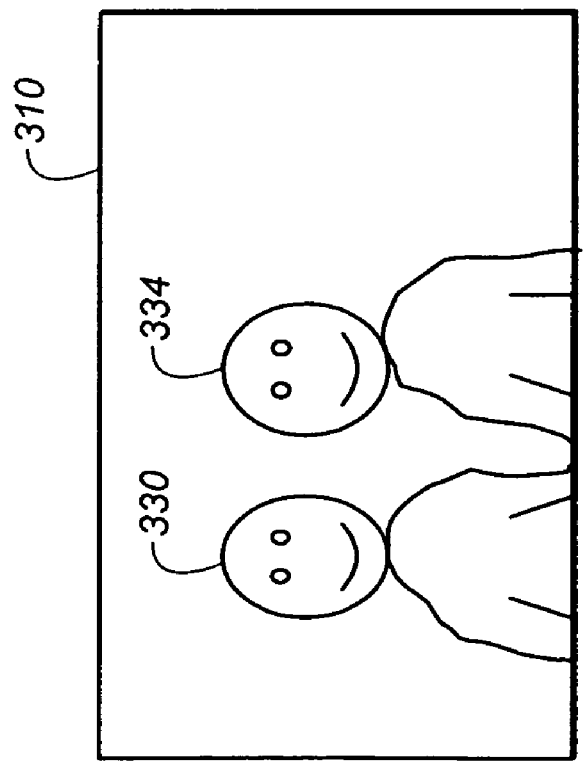
FIG. 6 is a semi-diagrammatical view of an example digital image, which includes images of two faces.
Figure 8:
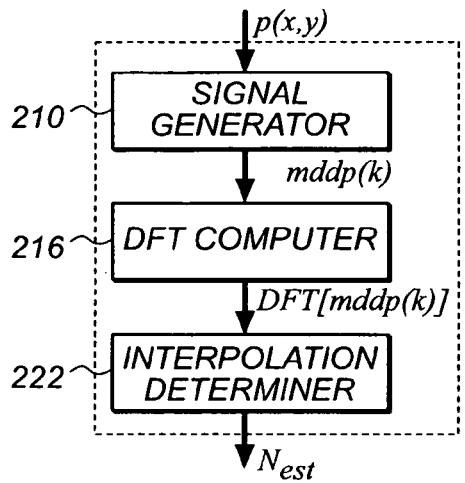
FIG. 8 is a block diagram illustrating an overview of a prior art interpolation detection method.

Referring to FIGS. 6-7, in a particular embodiment, face detection is used to find the region of interest. Forged images often involve human faces. A wide variety of face detection techniques are known. (See Ming-Hsuan Yang, David Kriegman, and Narendra Ahuja, "Detecting Faces in Images: A Survey", *IEEE Transactions on Pattern Analysis and Machine Intelligence* (*PAMI*), vol. 24, no. 1, pp.34-58, 2002. The particular face detection technique used is not critical.

FIG. 6 shows an example digital image 310 containing a first face 330 and a second face 334. FIG. 7 shows an image with two regions of interest 340, 341 associated with two faces and a comparison region 342 appropriate for determining whether the image 310 is a forgery composed of content from additional source images. Though the regions are shown as rectangles, those skilled in the art will recognize that other shapes, including arbitrary shapes, can be used. The digital image 310 is checked for past compression and then interpolation is evaluated in the different regions using one of the two interpolation detectors, resulting in an estimate of interpolation for each of the regions. As previously described, the interpolation detector determines whether the image was resampled with another sampling lattice. If for example, region 340 was found to be interpolated but regions 341 and 342 were determined to be uninterpolated, then the image is classified as a forgery. Furthermore, the forged region can be identified as the region 340. However, if all three regions are found to be interpolated (e.g. by a rotation of 10 degrees), then the image is not classified as a forgery because the situation can be explained by the consistent application of a resampling grid across an entire image, without addition of new content.

The present invention is applicable to digital video, which is a sequence of individual frames captured in rapid succession, for example, at a frame rate of one image for every 1/30 sec. The method can be performed on each frame in the video sequence. If interpolation is detected for a portion of a frame, then the video has been composed or forged. Furthermore, objects tend to move gradually in video, if interpolation is detected for the same object or region in the scene over a period of multiple frames, it is a stronger indication of composition or forgery.

The invention has been described in detail with particular reference to certain preferred embodiments thereof, but it will be understood that variations and modifications can be effected within the spirit and scope of the invention.

The invention claimed is:

1. A method implemented by a computer system, the method for detecting digital image compositing, said method comprising the steps of:
    finding an uncompressed digital image as a portion of a larger digital image having a higher likelihood of exhibiting forgery as compared to other portions of the larger digital image, the portion being found using a region-of-interest detector;
    detecting a first artifact in the uncompressed digital image, said first artifact being characteristic of an earlier compression of said uncompressed digital image with a predetermined compression algorithm;
    evaluating an interpolation marker in said uncompressed digital image to provide interpolation results;
    during said evaluating, counteracting a second artifact of said compression algorithm;
    classifying said larger digital image responsive to said interpolation results; and
    storing results of the classifying in a computer-readable memory device.

2. The method of claim 1 wherein said second artifact and said interpolation marker are different periodicities in said image.

3. The method of claim 2 wherein said first artifact is a blocking artifact.

4. The method of claim 1 wherein said first artifact is a blocking artifact.

5. The method of claim 1 wherein said method further comprises decompressing said portion of the larger digital image to generate the uncompressed digital image.

6. The method of claim 1 wherein said region of interest detector is selected from the group consisting of: face detectors, main subject detectors, skin region detectors, sky detectors, other object detectors, and combinations of two of more of said detectors of said group.

7. The method of claim 1 further comprising repeating said finding, detecting, evaluating, and counteracting steps with an additional digital image.

8. The method of claim 7 wherein said uncompressed digital image and said additional digital image are each different parts of the larger digital image; and wherein said classifying further comprises classifying said larger digital image responsive to said interpolation results.

9. The method of claim 8 further comprising accepting user input designating at least said uncompressed digital image or said additional digital image.

10. The method of claim 7 wherein said uncompressed digital image and said additional digital image are each a frame, or a portion of a frame, of a video sequence.

11. The method of claim 1 wherein said evaluating further comprises:
    generating a one-dimensional periodicity signal from the uncompressed digital image;
    computing a Discrete Fourier Transform of said periodicity signal; and
    detecting a first set of peaks in the said Discrete Fourier transform; and
    wherein said counteracting further comprises excluding from said detecting a second set of peaks in said Discrete Fourier Transform.

12. A computer program product for detecting digital image compositing, the computer program product comprising computer readable storage medium having a computer program stored thereon for performing the steps of claim 1.

13. A system for detecting digital image compositing, said method comprising the steps of:
    means for finding an uncompressed digital image as a portion of a larger digital image having a higher likelihood of exhibiting forgery as compared to other portions of the larger digital image;
    means for detecting a first artifact in said uncompressed digital image, said first artifact being characteristic of an earlier compression of said uncompressed digital image with a predetermined compression algorithm;

means for evaluating an interpolation marker in said uncompressed digital image to provide interpolation results;

means for counteracting a second artifact of said compression algorithm during said evaluating; and means for classifying said larger digital image responsive to said interpolation results.

14. A method implemented by a computer system, the method for detecting digital image compositing, said method comprising the steps of:

detecting the presence of a first artifact in said an uncompressed digital image, said first artifact being characteristic of an earlier compression of said digital image with a predetermined compression algorithm;

finding a plurality of different regions of said uncompressed digital image, at least one of the plurality of different regions having a higher likelihood of exhibiting forgery as compared to another of the plurality of different regions of the uncompressed digital image, at least some of the plurality of different regions being found using a region-of-interest detector;

evaluating an interpolation marker in the different regions to provide interpolation results of each of said regions;

when said first artifact is present in said digital image, counteracting a second artifact of said compression algorithm during said evaluating;

classifying said image responsive to said interpolation results; and storing results of the classifying in a computer-readable memory device.

15. The method of claim 14 wherein said first artifact is a blocking artifact and said second artifact and said interpolation marker are different periodicities in said image.

16. The method of claim 14 wherein said classifying further comprises comparing interpolation results of at least some of said regions.

17. The method of claim 14 wherein said evaluating of each of said regions further comprises:

generating a one-dimensional periodicity signal from the corresponding region;

computing a Discrete Fourier Transform of said periodicity signal; and detecting a first set of peaks in the said Discrete Fourier transform; and wherein said counteracting further comprises excluding from said detecting a second set of peaks in said Discrete Fourier Transform.

18. A method implemented by a computer system, the method for detecting digital image compositing, said method comprising the steps of:

finding an uncompressed digital image as a portion of a larger digital image having a higher likelihood of exhibiting forgery as compared to other portions of the larger digital image, the portion being found using a region-of-interest detector;

detecting a blocking artifact in the uncompressed digital image;

identifying a compression-induced periodicity artifact associated with said blocking artifact;

evaluating periodicity in said uncompressed digital image to provide interpolation results;

during said evaluating, counteracting said compression-induced periodicity artifact;

classifying said larger digital image responsive to said interpolation results; and storing results of the classifying in a computer-readable memory device.

19. The method of claim 8, wherein said classifying further comprises comparing interpolation results of said uncompressed digital image and said additional digital image.

20. The method of claim 19, wherein said additional digital image has a lower likelihood of exhibiting forgery as compared to the uncompressed digital image portion of the larger digital image.

21. The system of claim 13, wherein the finding, detecting, evaluating, and counteracting are performed for an additional portion of the larger digital image, and wherein the classifying further comprises comparing interpolation results of each of the uncompressed digital image and the additional portion of the larger digital image.

22. The method of claim 18 wherein the finding, detecting, evaluating, and counteracting steps are performed for an additional portion of the larger digital image, and wherein the classifying further comprises comparing interpolation results of each of the uncompressed digital image and the additional portion of the larger digital image.

* * * * *